(12) United States Patent
Chung et al.

(10) Patent No.: US 9,379,616 B2
(45) Date of Patent: Jun. 28, 2016

(54) CONTROL CIRCUIT WITH DEEP BURST MODE FOR POWER CONVERTER

(75) Inventors: Chi-Chen Chung, Hsinchu County (TW); Wei-Hsuan Huang, Taoyuan County (TW)

(73) Assignee: System General Corp., Taipei Hsien (TW)

( * ) Notice: Subject to any disclaimer, the term of this patent is extended or adjusted under 35 U.S.C. 154(b) by 57 days.

(21) Appl. No.: 13/572,777

(22) Filed: Aug. 13, 2012

(65) Prior Publication Data

US 2014/0043002 A1    Feb. 13, 2014

(51) Int. Cl.
*G05F 1/00*    (2006.01)
*H02M 3/335*    (2006.01)
*H02M 1/08*    (2006.01)
*H02M 1/00*    (2006.01)

(52) U.S. Cl.
CPC ............ *H02M 3/33507* (2013.01); *H02M 1/08* (2013.01); *H02M 2001/0035* (2013.01); *Y02B 70/16* (2013.01)

(58) Field of Classification Search
CPC .................................................... G05F 1/565
USPC ............. 323/282–285, 351; 363/21.01–21.18
See application file for complete search history.

(56) References Cited

U.S. PATENT DOCUMENTS

| | | | |
|---|---|---|---|
| 7,348,765 B2 | 3/2008 | Nishida | |
| 8,018,217 B2 | 9/2011 | Chen et al. | |
| 8,054,656 B2 | 11/2011 | Su et al. | |
| 8,587,964 B2 | 11/2013 | Yang et al. | |
| 8,649,129 B2* | 2/2014 | Huang | ............................ 361/18 |
| 8,698,472 B2 | 4/2014 | Yang et al. | |
| 2011/0101939 A1 | 5/2011 | Leng et al. | |
| 2012/0069608 A1* | 3/2012 | Yang | ................. H02M 3/33507 363/21.12 |

FOREIGN PATENT DOCUMENTS

| | | |
|---|---|---|
| CN | 102355145 A | 2/2012 |
| JP | 2007-209103 A | 8/2007 |
| TW | 200943679 A | 10/2009 |
| TW | 201008123 A | 2/2010 |
| TW | 201115897 A | 5/2011 |
| TW | 201125268 A | 7/2011 |

* cited by examiner

*Primary Examiner* — Adolf Berhane
*Assistant Examiner* — Afework Demisse
(74) *Attorney, Agent, or Firm* — Rosenberg, Klein & Lee (57) ABSTRACT

A control circuit with deep burst mode for power converter according to the present invention comprises a load detection circuit and a PWM circuit. The load detection circuit generates a switching control signal in response to a feedback signal. The feedback signal is correlated to a load condition of the power converter. The PWM circuit generates a switching signal to regulate an output of the power converter in response to the switching control signal and the feedback signal. The control circuit performs a deep burst mode to switch the switching signal only one time during each deep burst period when the load condition of the power converter is a very light-load. Therefore, switching loss is reduced so that the power consumption of the power converter is also reduced.

13 Claims, 6 Drawing Sheets

CONTROL CIRCUIT WITH DEEP BURST MODE FOR POWER CONVERTER

BACKGROUND OF THE INVENTION

1. Field of the Invention

The present invention is related to a control circuit, especially to a control circuit with deep burst mode for the power converter.

2. Description of the Related Art

A variety of power converters have been widely used to provide regulated voltage and current for various electronic products. Based on the restriction of environmental pollution, power converters have been required to meet the power management and energy conservation standards. The principle of power management is to manage the power consumption of system during its operation. Further, only a little quantity of power will be consumed during non-operation. With respect to the power converters in a power management application, saving power in a light-load condition is a major requirement.

Generally, a control circuit of the power converter generates a switching signal in response to a feedback signal. The feedback signal is correlated to a load condition of the power converter. The switching signal is used to switch a power transformer of the power converter for regulating an output of the power converter. In order to reduce the power consumption of the power converter, the power converter performs a burst mode for regulating the output of the power converter when the load condition of the power converter is light-load.

Figure 1:
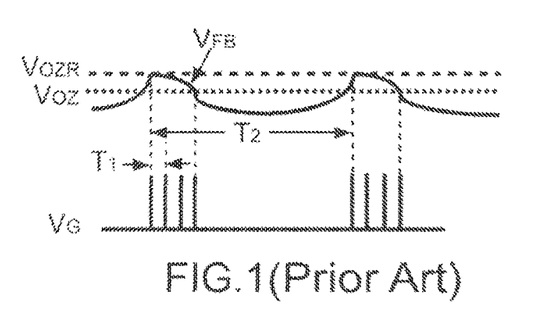
FIG. 1 shows waveforms of the conventional power converter performing the burst mode.

FIG. 1 shows waveforms of the conventional power converter performing the burst mode. Once the feedback signal $V_{FB}$ is lower than a threshold $V_{OZ}$, the switching signal $V_G$ is disabled for reducing the output of the power converter.

In other words, the power consumption is reduced when the load condition is the light-load. Further, once the feedback signal $V_{FB}$ is larger than a threshold $V_{OZR}$, the switching signal $V_G$ is enabled and then disabled after a short on-time, as like an impulse signal. In other words, the switching signal $V_G$ is switched to generate the impulse signal. The impulse signal is used to switch the power transformer of the power converter for providing a little quantity of power.

As shown in FIG. 1, when the load condition of the power converter is the light-load and the feedback signal $V_{FB}$ is larger than the threshold $V_{OZR}$, the switching signal $V_G$ is continuously switched until the feedback signal $V_{FB}$ is lower than the threshold $V_{OZ}$. Therefore, the switching signal $V_G$ is switched many times. Once the feedback signal $V_{FB}$ is larger than the threshold $V_{OZR}$ again, the switching signal $V_G$ is continuously switched until the feedback signal $V_{FB}$ is lower than the threshold $V_{OZ}$ again. Therefore, during each burst period $T_2$, the switching signal $V_G$ is switched many times, so the power transformer is also switched many times during each burst period $T_2$. It causes the increment of the switching loss, and therefore the power consumption can't be reduced efficiently. Generally, the burst period $T_2$ and the burst frequency are constant. For example, the burst frequency is 22K Hz. $T_1$ shown in FIG. 1 is a switching period of the switching signal $V_G$ under the burst mode.

Accordingly, the present invention provides a control circuit with deep burst mode to reduce the switching loss for reducing the power consumption.

BRIEF SUMMARY OF THE INVENTION

The object of the present invention is to provide a control circuit with deep burst mode for power converter. The control circuit reduces the amount of switching the power transformer to reduce the switching loss for reducing the power consumption when a load condition of the power converter is very light-load.

The control circuit with deep burst mode for power converter according to the present invention comprises a load detection circuit and a PWM circuit. The load detection circuit generates a switching control signal in response to a feedback signal. The feedback signal is correlated to the load condition of the power converter. The PWM circuit generates a switching signal to regulate an output of the power converter in response to the switching control signal and the feedback signal. The control circuit performs a deep burst mode to switch the switching signal only one time during each deep burst period when the load condition of the power converter is a very light-load. Therefore, switching loss is reduced so that the power consumption of the power converter is also reduced.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 2:
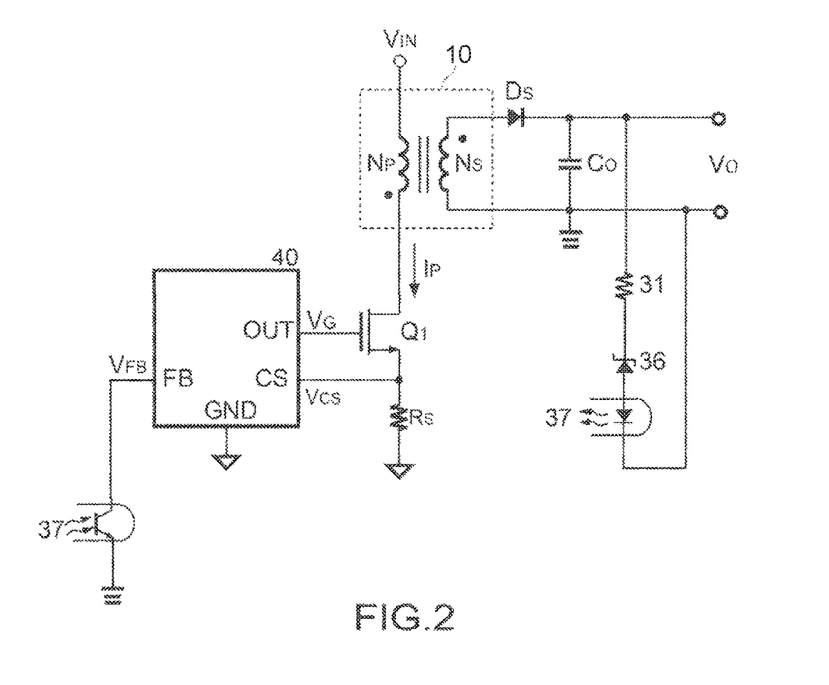
FIG. 2 shows a circuit diagram of an embodiment of a power converter in accordance with the present invention.

FIG. 2 shows a circuit diagram of an embodiment of a power converter in accordance with the present invention. A control circuit 40 has an output terminal OUT, a sense terminal CS, a feedback terminal FB, and a ground terminal GND. The ground terminal GND is coupled to a ground. The control circuit 40 outputs a switching signal $V_G$ to regulate an output (output voltage $V_O$ and/or output current) of the power converter in response to a feedback signal $V_{FB}$. The feedback signal $V_{FB}$ is correlated to the load condition of the power converter. The feedback signal $V_{FB}$ is generated at the feedback terminal FB of the control circuit 40. The switching signal $V_G$ drives a power transistor $Q_1$ coupled to a power transformer 10 for switching the power transformer 10.

The power transformer 10 is connected to an input voltage $V_{IN}$ of the power converter for energy store and power transferring. The stored energy of the power transformer 10 is transferred to an output terminal of the power converter through a rectifier $D_S$ and an output capacitor $C_O$ for generating the output voltage $V_O$. The power transformer 10 has a primary-side winding $N_P$ and a secondary-side winding $N_S$. A first terminal of the secondary-side winding $N_S$ is connected to an anode of the rectifier $D_S$. A second terminal of the secondary-side winding $N_S$ is connected to another ground. The output capacitor $C_O$ is connected between a cathode of the rectifier $D_S$ and the second terminal of the secondary-side winding $N_S$.

A sense resistor $R_S$ is connected in series with the power transistor $Q_1$ to generate a current signal $V_{CS}$ at the sense terminal CS of the control circuit 40 in response to a switching current $I_P$ of the power transformer 10. A first terminal of a resistor 31 is coupled to the output terminal of the power converter. A zener diode 36 is coupled from a second terminal of the resistor 31 to an input terminal of an opto-coupler 37. An output terminal of the opto-coupler 37 is coupled to the feedback terminal FB of the control circuit 40 to form a feedback loop for generating the feedback signal $V_{FB}$ in response to the output voltage $V_O$. The control circuit 40 modulates the pulse width of the switching signal $V_G$ in response to the feedback signal $V_{FB}$ to achieve the regulation of the power converter.

Figure 3:
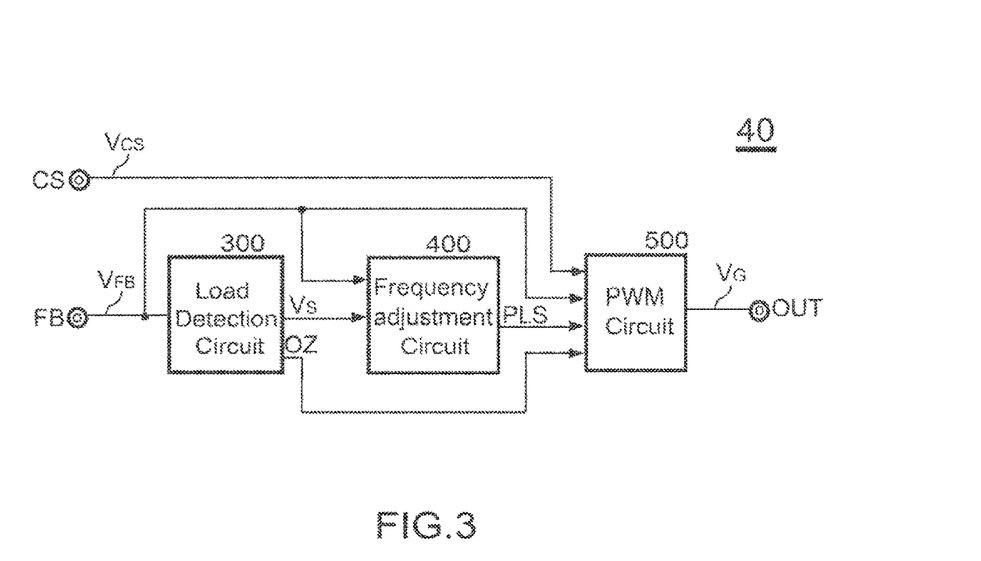
FIG. 3 shows a circuit diagram of an embodiment of the control circuit in accordance with the present invention.

FIG. 3 shows a circuit diagram of an embodiment of the control circuit in accordance with the present invention. The control circuit 40 comprises a load detection circuit 300 and a PWM circuit (pulse-width modulation circuit) 500.

The load detection circuit 300 is coupled to the feedback terminal FB to receive the feedback signal $V_{FB}$. The load detection circuit 300 generates a switching control signal OZ in response to the feedback signal $V_{FB}$. The switching control signal OZ is coupled to the PWM circuit 500. The load detection circuit 300 is further generates a detection signal $V_S$ in response to the feedback signal $V_{FB}$. The detection signal $V_S$ indicates that the load condition of the power converter is a very light-load or not.

The PWM circuit 500 is coupled to the feedback terminal FB and the load detection circuit 300 to receive the feedback signal $V_{FB}$ and the switching control signal OZ. The PWM circuit 500 generates the switching signal $V_G$ to regulate the output of the power converter in response to the switching control signal OZ and the feedback signal $V_{FB}$. The PWM circuit 500 performs a deep burst mode to switch the switching signal $V_G$ only one time during each deep burst period in response to the switching control signal OZ when the load condition of the power converter is the very light-load. The PWM circuit 500 is further coupled to the sense terminal CS to receive the current signal $V_{CS}$ for generating the switching signal $V_G$.

The control circuit 40 further comprises a frequency adjustment circuit 400. The frequency adjustment circuit 400 is coupled to the feedback terminal FB, the load detection circuit 300 and the PWM circuit 500 to receive the feedback signal $V_{FB}$ and the detection signal $V_S$. The frequency adjustment circuit 400 generates an oscillation signal PLS in response to the feedback signal $V_{FB}$ and the detection signal $V_S$ for controlling the frequency of the switching signal $V_G$ generated by the PWM circuit 500.

Figure 4:
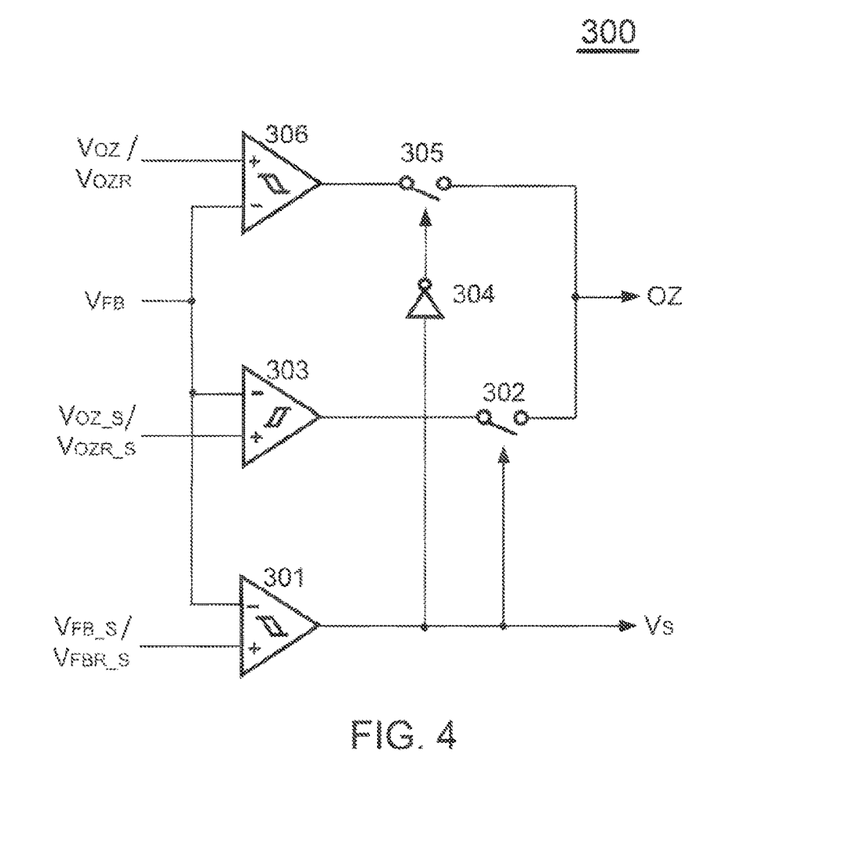
FIG. 4 shows a circuit diagram of an embodiment of the load detection circuit in accordance with the present invention.

FIG. 4 shows a circuit diagram of an embodiment of the load detection circuit in accordance with the present invention. The load detection circuit 300 comprises a load comparator 301, a first comparator 303, and a first switch 302. The load comparator 301 and the first comparator 303 are hysteresis comparators. The load comparator 301 has a very light-load threshold $V_{FB\_S}$ and a deep-burst off threshold $V_{FBR\_S}$ supplied with a positive input terminal of the load comparator 301. The very light-load threshold V $V_{FB\_S}$ is lower than the deep-burst off threshold V $V_{FBR\_S}$. For example, the very light-load threshold $V_{FB\_S}$ is 1.8V and the deep-burst off threshold $V_{FBR\_S}$ is 3.6V. A negative input terminal of the load comparator 301 receives the feedback signal $V_{FB}$.

The load comparator 301 compares the feedback signal $V_{FB}$ with the very light-load threshold $V_{FB\_S}$ to generate the detection signal $V_S$. When the load condition of the power converter is the very light-load, the feedback signal $V_{FB}$ is further lower. When the feedback signal $V_{FB}$ is lower than the very light-load threshold $V_{FBR\_S}$, the detection signal $V_S$ is a logic-high signal. It indicates that the load condition of the power converter is the very light-load.

Then, the load comparator 301 compares the feedback signal $V_{FB}$ with the deep-burst off threshold $V_{FBR\_S}$. When the load condition of the power converter is changed and the feedback signal $V_{FB}$ is larger than the deep-burst off threshold $V_{FBR\_S}$, the detection signal $V_S$ is a logic-low signal. It means that the load condition of the power converter is not the very light-load and may be a heavy-load. After, the load comparator 301 repeats to compare the feedback signal $V_{FB}$ with the very light-load threshold $V_{FB\_S}$.

The first comparator 303 has a first threshold $V_{OZ\_S}$ and a second threshold $V_{OZR\_S}$ supplied with a positive input terminal of the first comparator 303. A negative input terminal of the first comparator 303 receives the feedback signal $V_{FB}$. The first threshold $V_{OZ\_S}$ is lower than the second threshold $V_{OZR\_S}$ and larger than the very light-load threshold $V_{FB\_S}$. For example, the first threshold $V_{OZ\_S}$ is 2V and the second threshold $V_{OZR\_S}$ is 3.4V. The second threshold $V_{OZ\_S}$ is lower than the deep-burst off threshold $V_{FBR\_S}$. The first comparator 303 compares the feedback signal $V_{FB}$ with the first threshold $V_{OZ\_S}$ to generate an output signal as the switching control signal OZ. When the feedback signal $V_{FB}$ is lower than the first threshold $V_{OZ\_S}$, the output signal of the first comparator 303 is a logic-high signal for disabling the switching signal $V_G$.

Then, the first comparator 303 compares the feedback signal $V_{FB}$ with the second threshold $V_{OZR\_S}$. When the feedback signal $V_{FB}$ is larger than the second threshold $V_{OZR\_S}$, the output signal of the first comparator 303 is a logic-low signal for enabling the switching signal $V_G$. After, the first comparator 303 repeats to compare the feedback signal $V_{FB}$ with the first threshold $V_{OZ\_S}$.

The first switch 302 is coupled between the first comparator 303 and the PWM circuit 500. The first switch 302 is controlled by the detection signal $V_S$. When the feedback signal $V_{FB}$ is lower than the very light-load threshold $V_{FB\_S}$, the detection signal $V_S$ turns on the first switch 302 to output the output signal of the first comparator 303 to the PWM circuit 500 as the switching control signal OZ. The PWM circuit 500 performs a deep burst mode in response to the switching control signal OZ when the load condition of the power converter is the very light-load. In the meantime, the feedback signal $V_{FB}$ is lower than the first threshold $V_{OZ\_S}$, the output signal of the first comparator 303 is the logic-high signal. It means that the switching control signal OZ is the logic-high signal for disabling the switching signal $V_G$ when the load condition is the very light-load and the feedback signal $V_{FB}$ is lower than the first threshold $V_{OZ\_S}$, as shown in FIG. 6C. In other words, the switching control signal OZ disabling the switching signal $V_G$ in response to the detection signal $V_S$ when the load condition is the very light-load and the feedback signal $V_{FB}$ is lower than the first threshold $V_{OZ\_S}$.

Then, when the feedback signal $V_{FB}$ is larger than the second threshold $V_{OZR\_S}$, the output signal of the first comparator 303 is the logic-low signal.

Therefore, the switching control signal OZ is the logic-low signal for enabling the switching signal $V_G$ when the load condition is the very light-load and the feedback signal $V_{FB}$ is larger than the second threshold $V_{OZR\_S}$ until the feedback signal $V_{FB}$ is lower than the first threshold $V_{OZ\_S}$, as shown in FIG. 6C. In other words, the switching control signal OZ enabling the switching signal $V_G$ in response to the detection signal $V_S$ when the load condition is the very light-load and the feedback signal $V_{FB}$ is larger than the second threshold $V_{OZR\_S}$.

As shown in FIG. 6C, when the load condition is the very light-load, the PWM circuit 500 performs the deep burst mode to switch the switching signal $V_G$ only one time during each deep burst period $T_4$ in response to the switching control signal OZ. The deep burst period $T_4$ is beginning at the feedback signal $V_{FB}$ being larger than the second threshold $V_{OZR\_S}$ and ending at the feedback signal $V_{FB}$ being larger than the second threshold $V_{OZR\_S}$, again. The deep burst period $T_4$ and the deep burst frequency are constant and can be the same as the burst period $T_2$ (as shown in FIG. 1) and the burst frequency. For example, the deep burst frequency is 22K Hz. The power converter can efficiently reduce the power consumption due to the PWM circuit 500 switches the switching signal $V_G$ only one time during each deep burst period $T_4$ according to the present invention. $T_3$ shown in FIG. 6C is an on-time of the switching signal $V_G$ under the deep burst mode. The on-time $T_3$ is larger than the on-time of the switching signal $V_G$ under the burst mode (as shown in FIG. 1).

Accordingly, the load detection circuit 300 has the first threshold $V_{OZ\_S}$ and the second threshold $V_{OZR\_S}$. The PWM circuit 500 enables the switching signal $V_G$ in response to the switching control signal OZ when the load condition is the very light-load and the feedback signal $V_{FB}$ is larger than the second threshold $V_{OZR\_S}$. The PWM circuit 500 disables the switching signal $V_G$ in response to the switching control signal OZ when the load condition is the very light-load and the feedback signal $V_{FB}$ is lower than the first threshold $V_{OZ\_S}$.

The load detection circuit 300 further comprises a second comparator 306, a second switch 305, and an inverter 304. The second comparator 306 is the hysteresis comparator. The second comparator 306 has a third threshold $V_{OZ}$ and a fourth threshold $V_{OZR}$ supplied with a positive input terminal of the second comparator 306. A negative input terminal of the second comparator 306 receives the feedback signal $V_{FB}$. The third threshold $V_{OZ}$ is lower than the fourth threshold $V_{OZR}$ and can be equal to the first threshold $V_{OZ\_S}$. For example, the third threshold $V_{OZ}$ is 2V and the fourth threshold $V_{OZR}$ is 2.1V. The fourth threshold $V_{OZR}$ is larger than the first threshold $V_{OZ\_S}$ and lower than the second threshold $V_{OZR\_S}$. The second comparator 306 compares the feedback signal $V_{FB}$ with the third threshold $V_{OZ}$ to generate an output signal as the switching control signal OZ when the feedback signal $V_{FB}$ is larger than the very light-load threshold $V_{FB\_S}$ (the load condition is not the very light-load).

When the feedback signal $V_{FB}$ is larger than the third threshold $V_{OZ}$, the output signal of the second comparator 306 is a logic-low signal for enabling the switching signal $V_G$. On the contrary, when the feedback signal $V_{FB}$ is lower than the third threshold $V_{OZ}$, the output signal of the second comparator 306 is a logic-high signal for disabling the switching signal $V_G$. It means that the load condition is the light-load when the feedback signal $V_{FB}$ is larger than the very light-load threshold $V_{FB\_S}$ and lower than the third threshold $V_{OZ}$.

Then, the second comparator 306 compares the feedback signal $V_{FB}$ with the fourth threshold $V_{OZR}$. When the feedback signal $V_{FB}$ is larger than the fourth threshold $V_{OZR}$, the output signal of the second comparator 306 is the logic-low signal for enabling the switching signal $V_G$. After, the second comparator 306 repeats to compare the feedback signal $V_{FB}$ with the third threshold $V_{OZ}$.

The second switch 305 is coupled between the second comparator 306 and the PWM circuit 500. The second switch 305 is controlled by the detection signal $V_S$ through the inverter 304. The detection signal $V_S$ is coupled to an input terminal of the inverter 304. An output terminal of the inverter 304 is coupled to control the second switch 305. When the feedback signal $V_{FB}$ is larger than the very light-load threshold $V_{FB\_S}$, the detection signal $V_S$ turns off the first switch 302 and turns on the second switch 305 to output the output signal of the second comparator 306 to the PWM circuit 500 as the switching control signal OZ. In the meantime, the feedback signal $V_{FB}$ is lower than the third threshold $V_{OZ}$, the output signal of the second comparator 306 is the logic-high signal. It means that the switching control signal OZ is the logic-high signal for disabling the switching signal $V_G$, that the PWM circuit 500 performs the burst mode, when the load condition is the light-load. In other words, the switching control signal OZ disabling the switching signal $V_G$ in response to the detection signal $V_S$ when the load condition is not the very light-load and the feedback signal $V_{FB}$ is lower than the third threshold $V_{OZ}$ (load condition is the light-load).

Then, when the feedback signal $V_{FB}$ is larger than the fourth threshold $V_{OZR}$, the output signal of the second comparator 306 is the logic-low signal. Therefore, the switching control signal OZ is the logic-low signal for enabling the switching signal $V_G$ with short on-time, as like an impulse signal, when the load condition is the light-load and then the feedback signal $V_{FB}$ is larger than the fourth threshold $V_{OZR}$. Further, the switching signal $V_G$ is continuously switched for generating many impulse signals. The switching control signal OZ enabling the switching signal $V_G$ in response to the detection signal $V_S$ when the load condition is not the very light-load and the feedback signal $V_{FB}$ is larger than the fourth threshold $V_{OZR}$.

Figure 5:
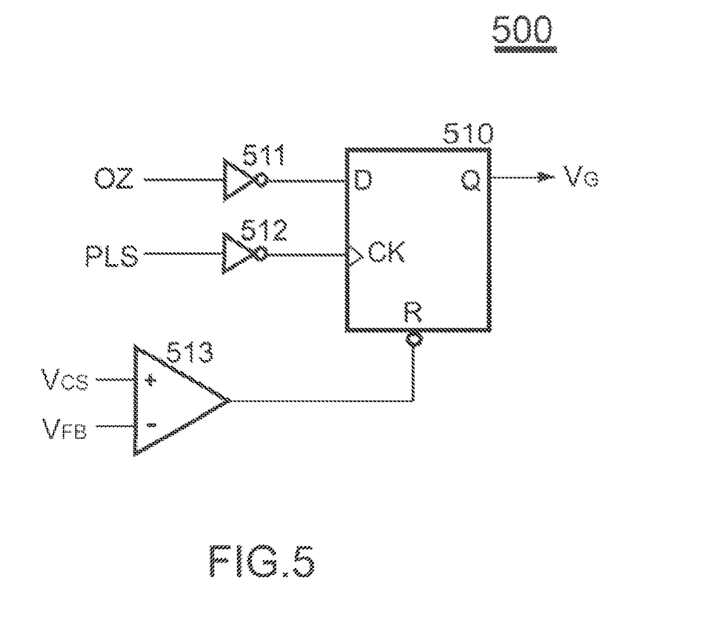
FIG. 5 shows a circuit diagram of an embodiment of the PWM circuit in accordance with the present invention.

FIG. 5 shows a circuit diagram of an embodiment of the PWM circuit in accordance with the present invention. The PWM circuit 500 comprises inverters 511, 512, a comparator 513 and a flip-flop 510. The switching control signal OZ generated by the load detection circuit 300 (as shown in FIG. 3) is coupled to an input terminal of the inverter 511. An output terminal of the inverter 511 is coupled to an input terminal D of the flip-flop 510. The switching control signal OZ is used to control the switching signal $V_G$. The switch signal $V_G$ is generated at an output terminal Q of the flip-flop 510. The oscillation signal PLS generated by the frequency adjustment circuit 400 (as shown in FIG. 3) is coupled to an input terminal of the inverter 512. An output terminal of the inverter 512 is coupled to a clock input terminal CK of the flip-flop 510. The oscillation signal PLS controls the frequency of the switching signal $V_G$.

A positive input terminal of the comparator 513 is coupled to receive the current signal $V_{CS}$. A negative input terminal of the comparator 513 is coupled to receive the feedback signal $V_{FB}$. An output terminal of the comparator 513 is coupled to a reset input terminal R of the flip-flop 510. The comparator 513 compares the feedback signal $V_{FB}$ with the current signal $V_{CS}$ to reset the flip-flop 510 for resetting the switching signal $V_G$.

Figure 6A:
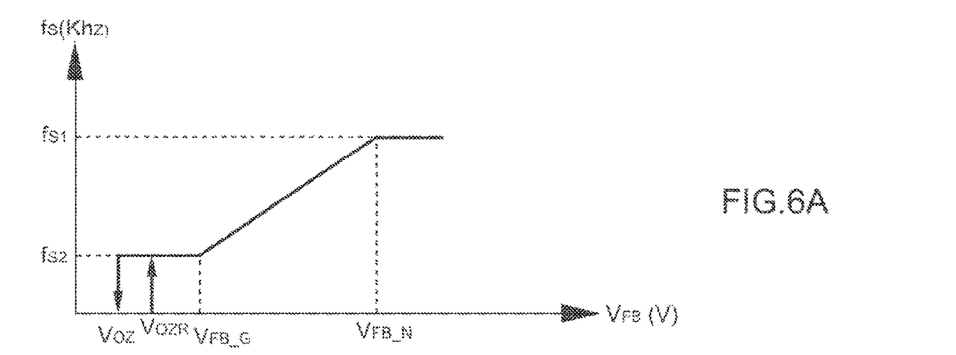
FIGS. 6A~6B show the frequency (fs)-feedback signal ($V_{FB}$) curve in accordance with the present invention.
Figure 6B:
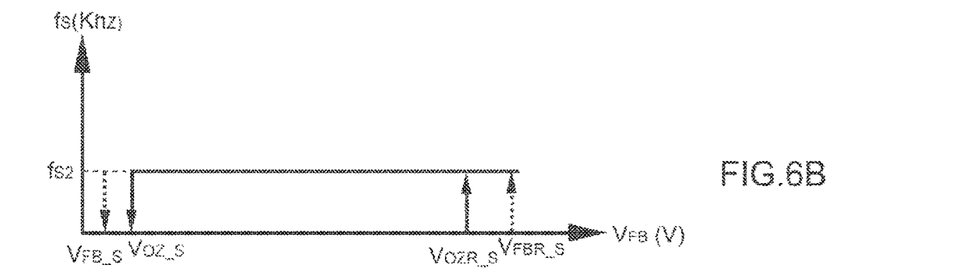
Figure 6C:
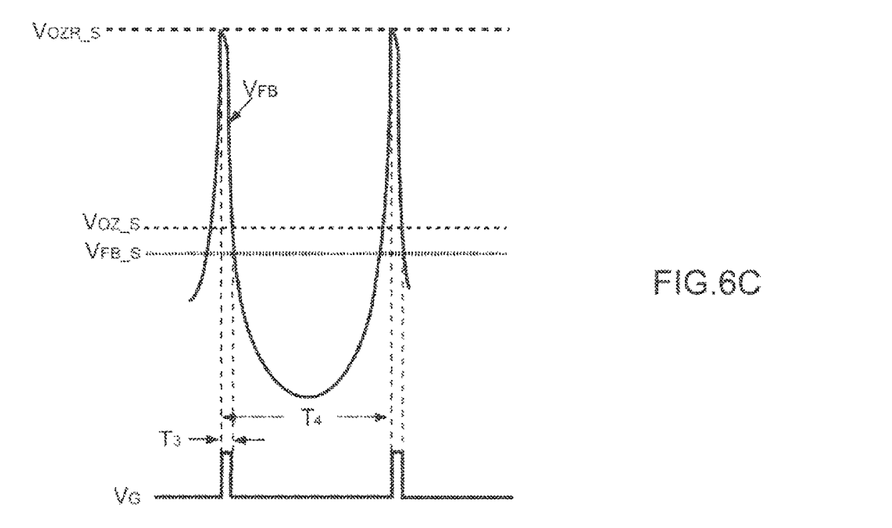
FIG. 6C shows the waveforms of the feedback signal $V_{FB}$ and the switching signal $V_G$ when the control circuit performing a deep burst mode in accordance with the present invention.

FIGS. 6A and 6B show the frequency (fs)-feedback signal ($V_{FB}$) curve in accordance with the present invention. The $f_{S1}$ is a maximum switching frequency of the switching signal $V_G$. The $f_{S2}$ is a minimum switching frequency of the switching signal $V_G$. As shown in FIG. 6A, when the feedback signal $V_{FB}$ is larger than a threshold $V_{FB\_N}$, the frequency of the switching signal $V_G$ is limited to the maximum switching frequency $f_{S1}$. Further, the frequency of the switching signal $V_G$ is reduced in accordance with the reduction of the feedback signal $V_{FB}$. In other words, the frequency of the switching signal $V_G$ is reduced in accordance with the reduction of the load of the power converter. However, the frequency of the switching signal $V_G$ is kept to the minimum switching frequency $f_{S2}$ when the feedback signal $V_{FB}$ is lower than a reference threshold $V_{FB\_G}$.

Referring to FIG. 6B, the very light-load threshold $V_{FB\_S}$ is lower than the first threshold $V_{OZ\_S}$, the first threshold $V_{OZ\_S}$ is lower than the second threshold $V_{OZR\_S}$, and the second threshold $V_{OZR\_S}$ is lower than the deep-burst off threshold $V_{FBR\_S}$. Referring to FIG. 6A, the third threshold $V_{OZ}$ is lower than the fourth threshold $V_{OZR}$ and can be equal to the first threshold $V_{OZ\_S}$ (as shown in FIG. 6B). When the feedback signal $V_{FB}$ is lower than the very light-load threshold $V_{FB\_S}$, the load detection circuit 300 (as shown in FIG. 4) outputs the output signal of the first comparator 303 as the switching control signal OZ. The PWM circuit 500 performs the deep burst mode in response to the switching control signal OZ.

As shown in FIG. 6C, the load detection circuit 300 (as shown in FIG. 4) disables the switching signal $V_G$ generated by the PWM circuit 500 (as shown in FIG. 3) when the feedback signal $V_{FB}$ is lower than the first threshold $V_{OZ\_S}$. Then, once the feedback signal $V_{FB}$ is larger than the second threshold $V_{OZR\_S}$, the load detection circuit 300 enables the switching signal $V_G$. The PWM circuit 500 switches the switching signal $V_G$ only one time during each deep burst period $T_4$. Therefore, the amount of switching the power transformer 10 (as show in FIG. 2) of the power converter is reduced when the load condition of the power converter is the very light-load so that the switching loss is reduced and the power consumption is also reduced.

In the meantime, the load detection circuit 300 outputs the detection signal $V_S$ to the frequency adjustment circuit 400 (as shown in FIG. 3). The frequency adjustment circuit 400 generates the oscillation signal PLS in response to the detection signal $V_S$ for controlling the frequency of the switching signal $V_G$. The frequency of the switching signal $V_G$ is adjusted to the minimum switching frequency $f_{S2}$ when the load condition of the power converter is the very light-load. Once the feedback signal $V_G$ is larger than the deep-burst off threshold $V_{FBR\_S}$, the PWM circuit 500 stops performing the deep burst mode.

Further, when the feedback signal $V_{FB}$ is larger than the very light-load threshold $V_{FB\_S}$ and lower than the third threshold $V_{OZ}$ (the load condition of the power converter is the light-load), the load detection circuit 300 (as shown in FIG. 4) outputs the output signal of the second comparator 306 as the switching control signal OZ. The PWM circuit 500 performs the burst mode in response to the switching control signal OZ. The PWM circuit 500 disables the switching signal $V_G$ when the feedback signal $V_{FB}$ is lower than the third threshold $V_{OZ}$. Then, once the feedback signal $V_{FB}$ is larger than the fourth threshold $V_{OZR}$, the PWM circuit 500 enables the switching signal $V_G$. The frequency of the switching signal $V_G$ is also adjusts to the minimum switching frequency $f_{S2}$ when the load condition of the power converter is the light-load.

Figure 7:
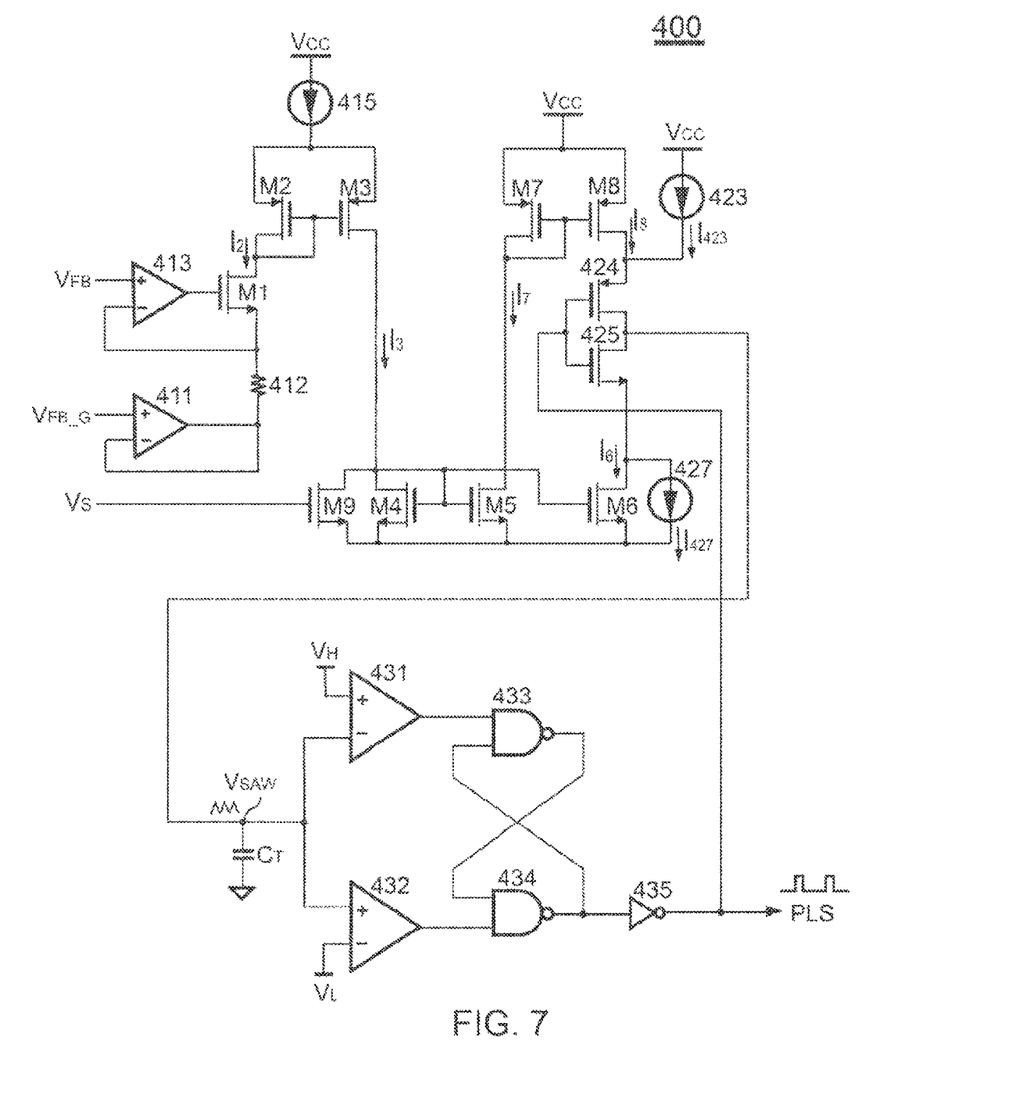
FIG. 7 shows a circuit diagram of an embodiment of the frequency adjustment circuit in accordance with the present invention.

FIG. 7 shows a circuit diagram of an embodiment of the frequency adjustment circuit 400 in accordance with the present invention. The frequency adjustment circuit 400 comprises a voltage to current converter, a plurality of current mirrors, a charge current source 423, a discharge current source 427, a capacitor $C_T$, and an oscillation circuit. The voltage to current converter includes a comparator 411, a resistor 412, a comparator 413, and a transistor M1.

The voltage to current converter receives the feedback signal $V_{FB}$ to generate a reference current $I_2$. A positive input terminal of the comparator 413 receives the feedback signal $V_{FB}$. A negative input terminal of the comparator 413 is coupled to a source of the transistor M1 and one terminal of the resistor 412. The other terminal of the resistor 412 is coupled to an output terminal of the comparator 411 and a negative input terminal of the comparator 411. An output terminal of the comparator 413 is coupled to a gate of the transistor M1 to control the transistor M1. A positive input terminal of the comparator 411 receives the reference threshold $V_{FB\_G}$. The negative input terminal of the comparator 411 is coupled to the output terminal of the comparator 411. The voltage to current converter generates the reference current $I_2$ in response to the difference between the feedback signal $V_{FB}$ and the reference threshold $V_{FB\_G}$.

A first current mirror comprises transistors M2 and M3. Sources of the transistors M2 and M3 are coupled to a current source 415. The current source 415 is coupled to a supply voltage $V_{CC}$. Gates of the transistors M2 and M3 and drains of the transistors M2 and M1 are coupled together. The first current mirror generates a current $I_3$ at a drain of the transistor M3 in response to the reference current $I_2$. The current $I_3$ is correlated to the reference current $I_2$. A second current mirror includes the transistors M4 and M5. Sources of the transistors M4 and M5 are coupled to the ground. Gates of the transistors M4 and M5 and drains of the transistors M4 and M3 are coupled together. The second current mirror generates a current $I_7$ at a drain of the transistors M5 in response to the current $I_3$.

A third current mirror includes the transistors M4 and M6. A source of the transistor M6 is coupled to the ground. A gate of the transistor M6 is coupled to the gates of the transistors M4 and M5 and the drains of the transistors M4 and M3. The third current mirror generates a first discharge current $I_6$ at a drain of the transistor M6 in response to the current $I_3$. The discharge current source 427 is coupled to the transistors M6 in parallel. The discharge current source 427 provides a second discharge current $I_{427}$ coupled to the first discharge current $I_6$.

A fourth current mirror includes the transistors M7 and M8. Sources of the transistors M7 and M8 are coupled to the supply voltage $V_{CC}$. Gates of the transistors M7 and M8 and drains of the transistors M7 and M5 are coupled together. The fourth current mirror generates a first charge current is at a drain of the transistor M8 in response to the current $I_7$. The charge current source 423 is coupled between the supply voltage $V_{CC}$ and the drain of the transistor M8.

The charge current source 423 provides a second charge current $I_{423}$ coupled to the first charge current $I_8$.

The capacitor $C_T$ is charged by the first charge current $I_8$ and the second charge current $I_{423}$ through a transistor 424. The capacitor $C_T$ is further discharged by the first discharge current $I_6$ and the second discharge current $I_{427}$ through a transistor 425. Therefore, a saw-tooth signal $V_{SAW}$ is generated at the capacitor $C_T$. A source of the transistor 424 is coupled to the charge current source 423 and the drain of the transistor M8 to deliver the second charge current $I_{423}$ and the first charge current $I_8$. A drain of the transistor 424 is coupled to one terminal the capacitor $C_T$. The other terminal of the capacitor $C_1$ is coupled to the ground. The oscillation signal PLS is coupled to a gate of the transistor 424 to control the transistor 424 for charging the capacitor $C_T$. A source of the transistor 425 is coupled to the discharge current source 427 and the drain of the transistor M6. A drain of the transistor 425 is coupled to the capacitor $C_T$. The oscillation signal PLS is coupled to a gate of the transistor 425 to control the transistor 425 for discharging the capacitor $C_T$.

The oscillation circuit generates the oscillation signal PLS in response to the saw-tooth signal $V_{SAW}$. The oscillation circuit comprises comparators 431, 432, NAND gates 433, 434, and an inverter 435. The saw-tooth signal $V_{SAW}$ is coupled to a negative input terminal of the comparator 431 and a positive input terminal of the comparator 432 for generate the oscillation signal PLS. A threshold $V_H$ is supplied with a positive input terminal of the comparator 431. A threshold $V_L$ is supplied with a negative input terminal of the comparator 432. An output terminal of the comparator 431 is coupled to an input terminal of the NAND gate 433. An output terminal of the comparator 432 is coupled to an input terminal of the NAND gate 434. The other input terminal of the NAND gate 434 is coupled to an output terminal of the NAND gate 433. An output terminal of the NAND gate 434 is coupled to the other input terminal of the NAND gate 433. The output terminal of the NAND gate 434 is further coupled to an input terminal of the inverter 435. An output terminal of the inverter 435 generates the oscillation signal PLS.

The first charge current is, the second charge current $I_{423}$, the first discharge current $I_6$, and the second discharge current $I_{427}$ determine the slope of the saw-tooth signal $V_{SAW}$ for determining the frequency of the oscillation signal PLS and also determining the frequency of the switching signal $V_G$. The second charge current $I_{423}$ and the second discharge current $I_{427}$ determine the minimum switching frequency $f_{S2}$ (as shown in FIG. 6B). The current source 415 determines the maximum switching frequency $f_{S1}$ (as shown in FIG. 6A).

Further, a transistor M9 is coupled between the current $I_3$ and the ground. A drain of the transistor M9 is coupled to the drains of the transistors M3 and M4. A source of the transistor M9 is coupled to the ground. The detection signal $V_S$ is coupled to a gate of the transistor M9 to control the transistor M9. Once the load condition of the power converter is the very light-load, the transistor M9 is turned on by the detection signal $V_S$. Therefore, the current $I_3$ flows to the ground, and the current $I_7$, the first discharge current $I_6$ and the first charge current $I_8$ are disabled. Accordingly, the frequency of the oscillation signal PLS is reduced and kept to the minimum switching frequency $f_{S2}$ (as shown in FIG. 6B) when the load condition is the very light-load. The frequency of the switching signal $V_G$ is also kept to the minimum switching frequency $f_{S2}$.

In addition, once the feedback signal $V_{FB}$ is larger than the very light-load threshold $V_{FB\_S}$ (the load condition is not the very light-load) and the reference threshold $V_{FB\_G}$ (as shown in FIG. 6A), the transistor M9 is turned off by the detection signal $V_S$ and the first discharge current $I_6$ and the first charge current $I_8$ are adjusted in response to the change of the feedback signal $V_{FB}$. Therefore, the frequency of the switching signal $V_G$ is reduced or increased in accordance with the reduction or increment of the feedback signal $V_{FB}$ when the feedback signal $V_{FB}$ is larger than the reference threshold $V_{FB\_G}$ and lower than the threshold $V_{FB\_N}$ (as shown in FIG. 6A). In other words, the frequency of the switching signal $V_G$ is reduced or increased in accordance with the reduction or increment of the load of the power converter.

Further, when the feedback signal V-n is equal to the reference threshold $V_{FB\_G}$ or lower than the reference threshold $V_{FB\_G}$, the frequency of the oscillation signal PLS is kept to the minimum switching frequency $f_{S2}$. The frequency of the switching signal $V_G$ is also kept to the minimum switching frequency $f_{S2}$.

Although the present invention and the advantages thereof have been described in detail, it should be understood that various changes, substitutions, and alternations can be made therein without departing from the spirit and scope of the invention as defined by the appended claims. That is, the discussion included in this invention is intended to serve as a basic description.

It should be understood that the specific discussion may not explicitly describe all embodiments possible; many alternatives are implicit. The generic nature of the invention may not fully explained and may not explicitly show that how each feature or element can actually be representative of a broader function or of a great variety of alternative or equivalent elements. Again, these are implicitly included in this disclosure. Neither the description nor the terminology is intended to limit the scope of the claims.

What is claimed is:

1. A control circuit with deep burst mode for power converter, comprising:
   a load detection circuit generating a switching control signal in response to a feedback signal, wherein the feedback signal is correlated to a load condition of the power converter; and
   a PWM circuit generating a switching signal to regulate an output of the power converter in response to the switching control signal and the feedback signal;
   wherein the control circuit performs a burst mode and a deep burst mode to switch the switching signal according to the load condition of the power converter, the control circuit performs the burst mode when the load condition of the power converter is a light-load, the control circuit performs the deep burst mode to switch the switching signal only one time during each deep burst period when the load condition of the power converter is a very light-load.

2. The control circuit as claimed in claim 1, wherein the load detection circuit has a first threshold and a second threshold, the PWM circuit enables the switching signal in response to the switching control signal when the load condition is the very light-load and the feedback signal is larger than the second threshold, and the PWM circuit disables the switching signal in response to the switching control signal when the load condition is the very light-load and the feedback signal is lower than the first threshold.

3. The control circuit as claimed in claim 1, wherein the load detection circuit comprises:
   a load comparator having a very light-load threshold and receiving the feedback signal for comparing the feedback signal with the very light-load threshold to generate a detection signal; and
   a first comparator having a first threshold and a second threshold and receiving the feedback signal for comparing the feedback signal with the first threshold or the second threshold to generate an output signal as the switching control signal, wherein the switching control signal enables the switching signal in response to the detection signal when the load condition is the very light-load and the feedback signal is larger than the second threshold, and the switching control signal disables the switching signal in response to the detection signal when the load condition is the very light-load and the feedback signal is lower than the first threshold.

4. The control circuit as claimed in claim 3, wherein the detection signal indicates that the load condition is the very light-load when the feedback signal is lower than the very light-load threshold.

5. The control circuit as claimed in claim 3, wherein the deep burst period is beginning at the feedback signal being larger than the second threshold and ending at the feedback signal being larger than the second threshold, again.

6. The control circuit as claimed in claim 3, wherein the load detection circuit further comprises:
a second comparator having a third threshold and a fourth threshold and receiving the feedback signal for comparing the feedback signal with the third threshold or the fourth threshold to generate an output signal as the switching control signal, wherein the switching control signal enables the switching signal in response to the detection signal when the load condition is not the very light-load and the feedback signal is larger than the fourth threshold, and the switching control signal disables the switching signal in response to the detection signal when the load condition is not the very light-load and the feedback signal is lower than the third threshold.

7. The control circuit as claimed in claim 6, wherein when the load condition is not the very light-load, the output signal generated by the second comparator is coupled to the PWM circuit and the output signal generated by the first comparator is not coupled to the PWM circuit in response to the detection signal.

8. The control circuit as claimed in claim 6, wherein the load condition is the light-load when the feedback signal is larger than the very light-load threshold and lower than the third threshold.

9. The control circuit as claimed in claim 6, wherein the load detection circuit further comprises:
a first switch coupled between the first comparator and the PWM circuit, wherein the first switch is controlled by the detection signal; and
a second switch coupled between the second comparator and the PWM circuit, wherein the second switch is controlled by the detection signal;
wherein when the load condition is the very light-load, the first switch is turned on by the detection signal and the output signal generated by the first comparator is coupled to the PWM circuit through the first switch; when the load condition is not the very light-load, the second switch is turned on by the detection signal and the output signal generated by the second comparator is coupled to the PWM circuit through the second switch.

10. The control circuit as claimed in claim 1, further comprising:
a frequency adjustment circuit generating an oscillation signal in response to the feedback signal and a detection signal for controlling the frequency of the e switching signal, wherein the detection signal controls the frequency of the oscillation signal.

11. The control circuit as claimed in claim 10, wherein the detection signal is generated by the load detection circuit in response to the feedback signal.

12. The control circuit as claimed in claim 10, wherein the frequency adjustment circuit comprises:
a voltage to current converter receiving the feedback signal to generating a reference current;
a plurality of current mirrors generating a first charge current and a first discharge current in response to the reference current;
a charge current source generating a second charge current coupled to the first charge current;
a discharge current source generating a second discharge current coupled to the first discharge current,
a capacitor charged by the first charge current and the second charge current and discharged by the first discharge current and the second discharge current for generating a saw-tooth signal; and
an oscillation circuit generating the oscillation signal in response to the saw-tooth signal.

13. The control circuit as claimed in claim 12, wherein the detection signal controls the current mirrors to disable the first charge current and the first discharge current when the load condition is the very light-load, the second charge current and the second discharge current determine a minimum switching frequency of the oscillation signal and the switching signal.

\* \* \* \* \*